United States Patent
Darlington

(10) Patent No.: US 6,727,091 B2
(45) Date of Patent: Apr. 27, 2004

(54) ROOM AIR CLEANSING USING HYDROPONIC PLANTS

(75) Inventor: Alan Blake Darlington, Guelph (CA)

(73) Assignee: University of Guelph, Guelph (CA)

( * ) Notice: Subject to any disclaimer, the term of this patent is extended or adjusted under 35 U.S.C. 154(b) by 0 days.

(21) Appl. No.: 10/157,912

(22) Filed: May 31, 2002

(65) Prior Publication Data

US 2003/0224507 A1 Dec. 4, 2003

(51) Int. Cl.[7] ................................................. C12M 1/14
(52) U.S. Cl. ................................. 435/299.1; 435/292.1; 47/64; 47/59 S
(58) Field of Search ..................... 435/266, 297.1, 435/292.1, 299.1; 47/59 R, 64, 59 S

(56) References Cited

U.S. PATENT DOCUMENTS

| | | | |
|---|---|---|---|
| 4,732,591 A | 3/1988 | Tujisawa et al. | 55/179 |
| 4,975,251 A | 12/1990 | Saceman | 422/124 |
| 5,078,972 A | 1/1992 | Saceman | 422/124 |
| 5,130,091 A | 7/1992 | Saceman | 422/4 |
| 5,180,552 A | 1/1993 | Saceman | 422/1 |
| 5,315,834 A | 5/1994 | Garaunts et al. | 62/78 |
| 5,433,923 A | 7/1995 | Wolverton et al. | 422/121 |
| 5,853,460 A | 12/1998 | Alcordo | 96/134 |

OTHER PUBLICATIONS

Biofiltration of Air Pollution Control, Devinny et al., date unknown.
The Biofiltration of Indoor Air I: A Novel Rector for a Novel Waste Gas Stream, Llewellyn et al., date unknown.
The Biofiltration of Indoor Air II: Microbial Loading of the Indoor Space, Mallany et al., date unknown.
The Biofiltration of Indoor Air III: air Flux and Temperature and Removal of VOCs, Darlington et al., date unknown.
Beneficial Effects of Plants in the Remediation of Soil and Groundwater Contaminated with Organic Materials, Shimp et al., 1993.
Phytoremediation of the Brink of Commercialization, Watanabe, 1997.

*Primary Examiner*—David A. Redding
(74) *Attorney, Agent, or Firm*—Anthony Asquith & Co.

(57) ABSTRACT

The plants are disposed on a near-vertical matrix panel of porous or fibrous inert material, in which the roots of the plants are embedded. Hydroponic water trickles down the panel, keeping the roots wet. A fan draws the air to be treated horizontally through the panel. The unit freshens stale air in a room. It may be provided as a wall-mounted unit, or as a self-standing tower unit.

17 Claims, 2 Drawing Sheets

ROOM AIR CLEANSING USING HYDROPONIC PLANTS

This invention relates to treating indoor air by passing the air over and through the foliage and roots of hydroponically-nourished plants.

BACKGROUND TO THE INVENTION

Airborne contaminants can build up in a room where ventilation is not adequate, giving air its stale quality. The contaminants can include organic detritus from human and other living occupants of the room, and can include organic and non-organic vapours, gases, and particles, such as benzine, soot, dust.

The volatile organic contaminants (VOCS) can be broken down by microbial action. But one problem is that the contaminants are present in such small concentrations that colonies of microbes would not be viable, if the microbes were to feed exclusively or mainly on the tiny traces of organic materials that make up the contaminants.

The technique has arisen of providing plants, to assist in removing organic airborne contaminants. The plants are provided especially in respect of those rooms of a building in which the inevitable imperfections and variables of the building's air ventilation and filtration system has meant that that particular room is not achieving, as a matter of fact, the number of air changes in a given period of time, as needed to keep the air fresh. These rooms or pockets of stale air, where they occur, might be relieved by opening the windows, but many modem buildings do not have openable windows.

The publication of research indicating that plants improve air quality makes the use of indoor plants in buildings appealing, and widespread. And of course, plants may be placed in a room just for the aesthetic benefits. However, the fact is that simply adding a few pot-plants into a room does not, as a rule, do much to improve air quality.

The microbe colonies that can feed on, and thereby break down, airborne organic pollutants, tend to become established primarily on the roots of plants. The micro-biological reactions that lead to the breakdown of the airborne organic pollutants arise from microbe colonies that are aerobic, i.e that derive oxygen mainly from the atmosphere. The amount of exposure to air that such colonies need, in order to become viable, is quite small; thus, plant roots need only a minimum of aeration in order for the colonies to be viable.

Laboratory tests have shown that microbial reactions arising from plants, and especially arising from the aerobic microbes that become established in the roots of plants, can improve the rate of breakdown of many airborne organic contaminants. However, as mentioned, it is one thing for laboratory tests to show that microbe colonies on plant roots can break down airborne organic pollutants—and quite another to actually make a difference to the quality of air in the room. That plants can improve indoor air quality is known; the present invention is concerned with actually achieving a worthwhile improvement in the air quality in a stale-air room, by the use of a practical and economical apparatus.

The present invention is aimed at arranging plants, and in passing air through plants, in such manner as to enhance the ability of microbe colonies associated with the plants to break down airborne pollutants. The invention is intended mainly for use in cases where the ventilation system of a building has left a room or other pocket in the building with an inadequate or reduced ventilation throughtlow, to the extent that the air in that room or pocket is characterised as stale.

Architects are aware of the complaints of occupants of stale-air rooms, and tend to over-engineer the ventilation system, by large margins (which can be expensive) in the hope of avoiding such complaints. With the present invention, stale air pockets can be alleviated, and the aim is that the architect, knowing this, may more economically engineer the ventilation system with smaller margins.

THE PRIOR ART

The futility is known, of trying to freshen up the air in a room by simply placing a few (or many) pot-plants in the room. Prior approaches have included the much more controlled and structured environment of hydroponic cultivation techniques. However, while it is known that the air should be passed over the roots of the plants, for best results, still designers have had difficulty in engineering a mechanical arrangement whereby large volumes of air can be passed over and through the root zones. In some prior proposals, the matrix panel in which the plants are physically mounted has been horizontal, and it has proved difficult to arrange for adequately large volumetric flow-rates of air to pass through the roots of the plants, given that the roots are kept under water.

In other proposals, the plants have not been nourished hydroponically, but have been planted in ordinary organic soil, and watered occasionally. The difficulty here is that the nutrients in the soil only last for a limited period, and also that salts and waste products build up in the root zone of the soil.

It is known to take dust and particulate pollutants out of air by means which do not involve plants, for example by means of a wet scrubber. This amounts to passing the air through a (falling) curtain of water. The particles are sorbed out of the air, into the water droplets; that is to say, the drops of water in the curtain develop an electrostatic potential that attracts the particulates, causing them to remain with the water. However, in this (plant-less) system, the contaminants remain intact, and build up concentration in the scrubber apparatus, where they might cause even more problems than when diluted in the air.

THE INVENTION IN RELATION TO THE PRIOR ART

The present invention is aimed at providing an air-cleansing system which can treat a large volumetric flow rate of air. The large volumetric throughput means that air in the room can be circulated over and through the roots, again and again, many times. Again it is noted that the pollutants are present in the air only in very tiny traces. It is the fact of the prolonged exposure of the occupants of the room to the pollutants, not high concentrations of the pollutants, that makes the pollutants harmful. It is recognised that the way to remove such tiny traces from the air is to pass the air through the treatment system many times, which is why the large flow-rates are necessary.

The invention aims to provide an air-cleansing system in which large airflows can be effectively treated, and to do so by means of an apparatus that operates consistently and efficiently over a long period of time (e.g years), basically with very little attention. Since the system is mainly intended to be housed in an already-existing room, in a building, the invention aims also to provide an apparatus which can be made light in weight, and self-contained and self-supporting enough to be easy to install. Also, the invention aims to provide a system in which the apparatus can be manufactured in-factory, and can be factory-prepared for installation, whereby the apparatus can be shipped, and installed, and brought into operation, with a minimum of skilled knowledge and attentive care on the part of the installer and other operatives.

In order to break down the airborne contaminants, it is recognised that the air has to be circulated and recirculated through the plant roots, very many times. It can be many hours, or days, before an improvement (i.e a significant reduction in the concentrations of the contaminants) can be detected and noticed. One key to the successful performance of an air freshening treatment apparatus is that the apparatus should be able to handle large volumetric flow rates of air, and should be able to direct and focus the air onto the plant roots, where the microbe colonies are established.

GENERAL FEATURES OF THE INVENTION

An air-cleansing unit that embodies the present invention includes a plant-box, and the plant-box has a front wall, and enclosing walls, which enclose and define a plenum chamber. The plenum has an air outlet port, in one of the walls. The unit includes a powered fan, which is so disposed in the apparatus as to be effective to receive air from the plenum, through the air outlet port, and to discharge the air.

Preferably, the front wall of the plant-box includes a root matrix panel, which is made from air-permeable material, and is so arranged in the apparatus as to allow air to pass therethrough, into the plenum. The material of the panel is structurally solid, and is of such porosity or fibrosity as to enable the roots of plants to infiltrate into the material, and to provide physical and mechanical anchorage and support for the roots and foliage of the plants.

Preferably, the plants are grown and nourished hydroponically. The material of the root matrix panel of the plant-box is inert with respect to microbiological actions and reactions associated with the mass of plants. The apparatus includes a hydroponic water and nutrient circulation system. A water outlet is positioned above the root matrix panel, and is so arranged that hydroponic water passes out from the outlet, down onto the root matrix panel.

Preferably, the hydroponic water trickles down, from the outlet, over and through the material of the root matrix panel, and over and through the roots of the plants embedded therein. The system is so arranged that the roots of the mass of plants are kept substantially constantly wetted by the hydroponic water.

Preferably, the root matrix panel is disposed nearly vertically, but preferably with a slight incline to the vertical. Hydroponic water flows downwards, under gravity, over and through the material of the panel, and over and through he roots of the plants embedded therein, while air passes through the panel, into the plenum, in a direction that is at least roughly horizontal.

Arranged thus, the apparatus can treat large through-flows of air, over long periods. The VOCs and organic dust particles are efficiently sorbed out of the air, onto the water, becoming deposited onto the roots of the plants, where the microbes are present in viable colonies. The colonies are nourished by the normal plant actions; the colonies consume and break down the pollutants as a side effect. It may be noted that green foliage can also be effective to reduce the concentration of carbon monoxide in air, provided the air is kept moving over the foliage, which is indeed what happens in the apparatus as described.

To run efficiently over a long period, the apparatus should be built in, and automated as required. Thus, the apparatus should be provided with mains electricity, a water supply, a water drain, and nutrient reservoirs. If the light in the room is low, extra bright lights should also be provided, to enhance the hydroponic viability of the plants.

The physical movement of the water, in constantly trickling through the matrix panel, helps to ensure that the water maintains the electrostatic polar potential that sorbs the VOCs, dust, etc, out of the passing air.

DETAILED DESCRIPTION OF PREFERRED EMBODIMENTS

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1:
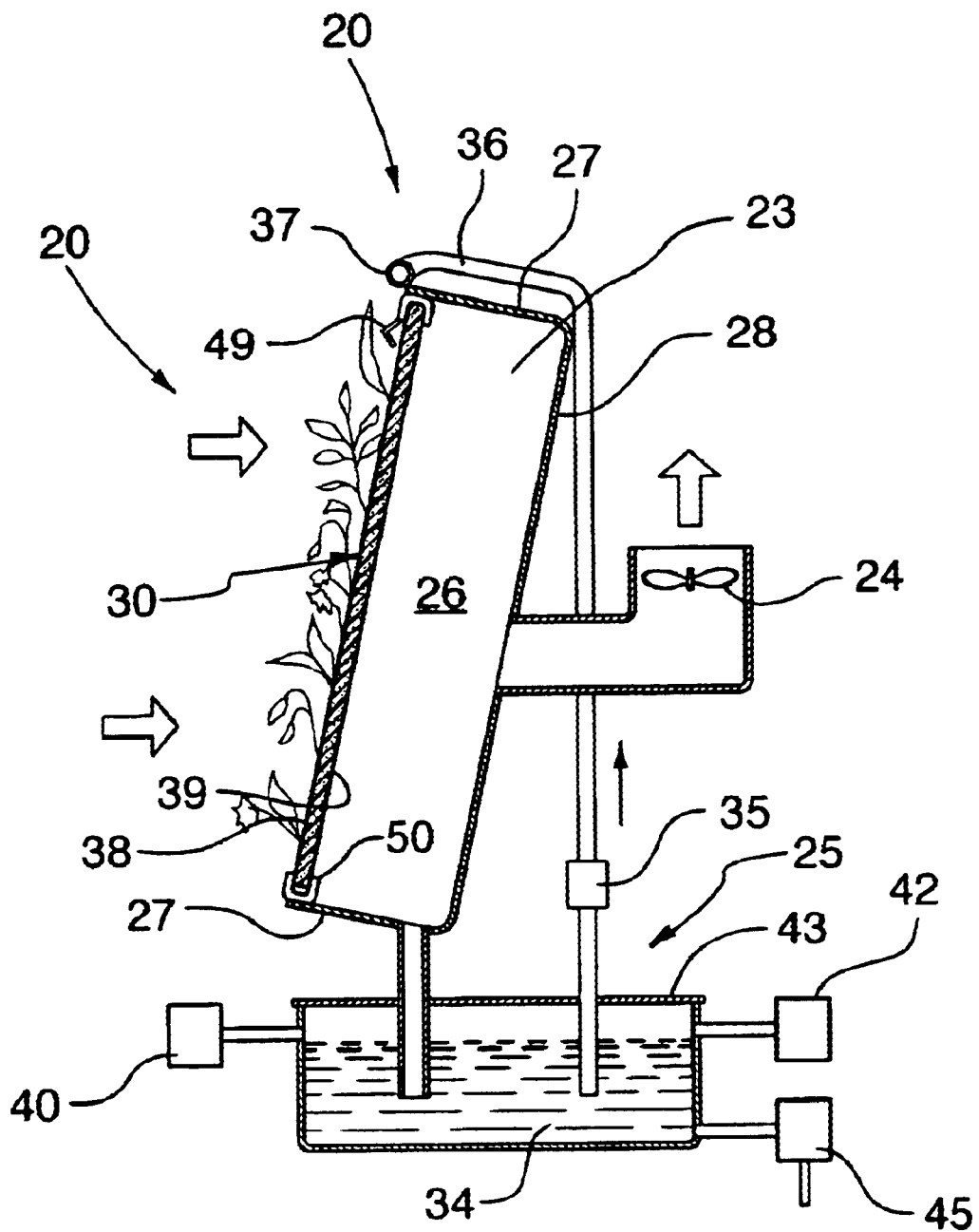
FIG. 1 is a diagrammatic cross-section of an indoor air cleansing unit that embodies the invention.

The air-cleansing unit 20 shown in FIG. 1 comprises basically a plant-box 23, an air circulation fan 24, and a hydroponic water-circulation circuit 25.

The plant-box 23 comprises a plenum chamber 26, enclosed by side walls 27 and a back wall 28. The back wall 28 has an air outlet port 29, through which air is drawn out of the plenum 26 by the electric fan 24. The reduced air pressure inside the plenum 26 draws room air in through the front wall 30 of the plant-box 23.

The front-wall 30 is a panel comprising a matrix of porous, permeable material 32. The material may be coir (coconut fibre), or other suitable material. The material must be air-permeable, and should be fibrous or porous, to the extent that the roots of plants can become physically interwoven with or into the fibres or pores, whereby the matrix panel provides mechanical or physical support for the plants. The matrix panel should be thick enough to provide proper support for the plant roots, but not so thick that the panel loses permeability. Preferably, the material should be one or two cm thick, and preferably between a half and three cm thick.

The matrix material as used in the front panel of the plant-box, for supporting the roots of the plants, should have substantial mechanical strength and rigidity. Also, the material should be such that its strength and rigidity do not deteriorate over a long period of time. Some of the root-supporting materials that are traditionally used in hydroponic horticulture, such as horticultural foam, or rock-wool, do not have this long-term stability, but tend to break down after long periods of immersion in water. This does not matter so much in ordinary hydroponics, where the root-supporting material is discarded when the plant is harvested, after a growth period of typically a few weeks. Where these materials are used in long-term growth situations, generally, greenhouse producers who use these materials must replace all of their rooting medium every two years or so, because of this breakdown.

The plant-box system as described herein is intended for long term use, using the same plants. It is not the intention that the plants should have to be replaced every year or every two years. Thus, in order for the plant-box system to perform to its best economic advantage, the root-supporting material should not be the typical material used for commercial greenhouses or hydroponic horticulture. Where a material is subject to structural changes in its physical characteristics over time, or is generally mechanically fragile, that is an indication that the material is unsuitable for use as the root-supporting matrix material as described herein. The material is unsuitable not least because the diminishment of properties would be uneven, leading to the development of unwanted pathways, both for the throughflow of air, and for the water.

Apart from coir matting, synthetic materials may be used, such as woven polyester in the form of fibrous matting. The kind of material as used to form the cleaning pads of industrial floor-polishers may be suitable; such materials comprise thick, heavy fibres, of e.g polyester, which have been matted and glued together to form a moulded pad. Characteristics such as porosity, permeability, fibre density, overall panel thickness, etc, can be easily controlled during manufacture. Such materials would not be expected to deteriorate or vary over time, when used in a plant-box system. Preferably, the material should be water-absorbing (hydrophillic) in nature, to improve microbial growth.

If the material of the matrix panel itself lacks the structural rigidity needed to support itself in the context of the front panel of the plant-box, a mesh of e.g plastic netting may be provided, as a trellis, to which the porous or fibrous material is attached. It is preferred not to use metal for the components that will come in contact with the water, to avoid the possibility of metallic contaminants leaching into the water.

The air-permeability of the matrix panel 32 should be such that, given the plenum 26, and the fan 24, the air passes through the matrix panel more or less evenly over the whole area of the matrix panel. It would be a disadvantage if pathways were to develop through the matrix panel material. Of course, some unwanted pathways will inevitably develop, especially as plant roots become established in the material, but with careful attention to the design of the plenum and fan, and with careful selection of the plants for (inter alia) the evenness of their roots, it may be expected that the air permeability of the matrix panel can be functionally uniform, over its whole area, for a long service life.

The material of the matrix panel 32 should be inert, i.e inert with respect to the microbiological reactions associated with plant growth, and inert with respect to the breakdown reactions associated with airborne pollutants. The material should not be soil, i.e organic material that provides nutrients and resources directly for plant growth. The purpose of the matrix panel is to provide mechanical support for the plants. The nutritional needs of the plants are provided hydroponically, as will be described.

The hydroponic water-circulation circuit 25 comprises a water storage tank 34, from which water is pumped (pump 35) up delivery pipe 36 to a water-outlet 37. The delivery system should be designed to deliver water evenly across the width of the matrix panel 32, whereby water trickles down evenly over the whole matrix panel.

The matrix panel should be inclined at a slight angle to the vertical, as shown. The outlet 37 delivers the water to the front surface 38 of the matrix panel 32, and the slope ensures that the water flows evenly over the matrix panel, without pooling on the surface, or in any area, of the matrix panel. Also, the designer should design the slope so that water flows right through the matrix panel, passing out of the matrix panel via the back surface 39 thereof. Preferably, the water is deposited from the water outlet 37 solely onto the top outer edge 49 of the matrix panel, evenly across the width of the matrix panel, and leaves the matrix panel by dripping solely from the bottom inner edge 50 of the matrix panel, again evenly across the width of the matrix panel.

The slope should not be so great (i.e so nearly horizontal) that the water flows straight through the matrix panel, and dripping out or trickling down the back surface 39. Nor should the slope be so slight that the water remains on the front surface 38. The designer's aim, in setting out the matrix panel, and the manner of feeding the water to the matrix, should be that the whole matrix, front to back, side to side, top to bottom, should be even as to the volume of water contained, and as to the uniformity of the movement of the water therethrough.

The unit preferably should exceed a certain minimum size, in order to ensure that the air surrounding the unit is treated at a rate that substantially exceeds the rate at which new pollutant materials are added to the air. For this reason, the permeability area of the matrix panel preferably should exceed fifty cm as to its height, and fifty cm as to its width. Typically, for freshening up the air in a stale-air pocket or room of e.g an office building, having a powered ventilation system, the height and width of the panel should each be in the sixty cm to hundred cm range.

Preferably, the flow of water should be continuous. The matrix panel, and the roots of the plants, should be subject to a constant trickle of water. The matrix panel, or rather the roots of the plants, should never be allowed to dry out, but should be kept constantly wet—in the manner of, and in accordance with the principles of, hydroponic cultivation. Of course, some water will be lost through evaporation, but the rate at which the water trickles over the matrix panel, and over the plant roots, should be large enough that evaporation is of little significance—again, in accordance with the principles of hydroponics.

Water passing down out of the matrix panel collects in the tank 34. The nutrients required for plant growth are provided in the tank 34. The level and mix of nutrients in the water is analyzed and the nutrients added automatically, as required, from suitable reservoirs 40. Make-up water is supplied through water inlet port 42. The cover 43 of the tank should be opaque, to limit the growth of algae in the nutrient-rich water.

As mentioned, water should be kept moving through the matrix panel 32 fast enough that evaporation is insignificant. If evaporation were to occur, salts would be precipitated onto the matrix panel and onto the roots of the plants. These salts come not only from the hardness of the water, but from the microbiological reactions associated with plant growth.

The constant movement of the water washes the salts out of the matrix panel, and out of the roots. The designer should ensure that the salts are carried away by the moving water. With careful design, the plant roots can be kept free of salts precipitation, over a long service life. The salts collect in the water in the water storage tank 34, and periodically the water in the tank should be drained off (drain 45) and replaced with clean water.

The plants, once established, do not need to be replaced. Maintenance of the plants is limited to mainly-cosmetic trimming of the green foliage, and to the occasional trimming off of any root strands that might protrude right through the matrix panel. The plant-box 23 should be located in a place where adequate light falls on the plants, to ensure viability, and artificial lights should be provided if needed.

The unit 20 is intended to be mounted on a wall of the room in which the air is to be cleaned. The designer should ensure that the dimensions of the plant-box 23 are suitable for this type of installation. The water tank 34 can be integrated into the structure of the plant-box. Or, the water tank can be structurally separate, and connected to the plant-box by pipes. The unit can be manufactured in-factory. In fact, the plants may be installed in-factory, whereby the unit, as sold, already has established, viable plants. Of course, in that case, the hydroponic system must be kept operating while the unit is stored, prior to sale; but that is not onerous. Alternatively, the factory-manufactured unit can be shipped and stored and sold without plants.

In the installed unit, the plants themselves may be open to the room, whereby a person in the room can touch the plants. If this is not desired, a screen can be placed in front of the plants, so long as it does not prevent air from flowing evenly over the plants. However, one of the side-benefits of providing the unit 20 is that the occupants of the room should be able to at least see the green plants.

Various species of plants may be used in the unit 20. The plants should be such that they root evenly through the matrix panel 32, and will support themselves physically with their roots embedded in a near-vertical matrix panel. The plants should be of the kind that do not grow very tall, and which stop growing larger, and do not spread unduly, once established. The plants should be of the kind that stay the same for long periods. The plants should be compatible with, and not overwhelm, each other. The plants should have roots that each fill up their own local area of the matrix panel evenly, without spreading unduly, or clogging the matrix panel. Suitable plants include: ferns, mosses, orchids, especially such species as croton, baby's tears, and the like.

Plants of the mint family (Lamiaceae), and other culinary herbs, are especially suitable for inclusion in the plant-box, for the reasons as will now be explained. Phenolic compounds and various terpenoids (sometimes referred to as the essential oils) are generated by members of the mint family. These aromatic compounds preponderate in the environments in which such plants grow, including in the roots of the plants and, when the plants are grown hydroponically, in the zones of the matrix panel in which the roots are embedded. The aromatic mint compounds find their way into the plant roots, and into the root zone, by direct exudation, or by being released into the root zone through the shedding of roots, leaves, and other plant parts, or by volatilization of the aromatic mint compounds on or in the leaves and by diffusion of the resulting (gaseous) compounds into the root zone. By these mechanisms, the roots, and the area of the matrix panel in which the roots are embedded, are continuously exposed to the aromatic mint compounds.

Microbe colonies around the root zones of plants such as mint are thus subjected to continuous exposure to high levels of the aromatic compounds. As a result, the microbes present in the root zones of mint plants (and of many of the other culinary herbs) develop an enhanced ability to assimilate, and break down, these aromatic compounds.

It is recognised that some of the volatile organic contaminants found indoors are similar in chemical structure to the aromatic mint compounds. For example, typical indoor organic pollutants such as e.g benzene and toluene are chemically similar in many ways to compounds found in aromatic plants, such as mint. It is recognised that organic compounds having similar structures tend to be degraded by similar microbiological processes.

Thus, it can be beneficial to include plants of the mint family (Lamiaceae) and other culinary herbs in the plant-box of the air cleansing unit described herein. Mint plants inherently provide a population of microbes that is specialised at feeding off, and thereby breaking down, the aromatic mint compounds; such microbe colonies therefore may be expected to have an enhanced capability for feeding off, and thereby breaking down, the volatile organic contaminants likely to be encountered in stale air, in a room in a building.

Thus, mint, and other aromatic culinary herbs, may be expected to perform significantly better, in the plant-box, as regards the rate at which contaminants are broken down, than many other plant species. The colonies of microbes associated with the roots of those other plant species do of course have some capability to feed off VOCs, but they do not have the focussed or specialised capability of the microbe colonies associated with mints.

Figure 2:
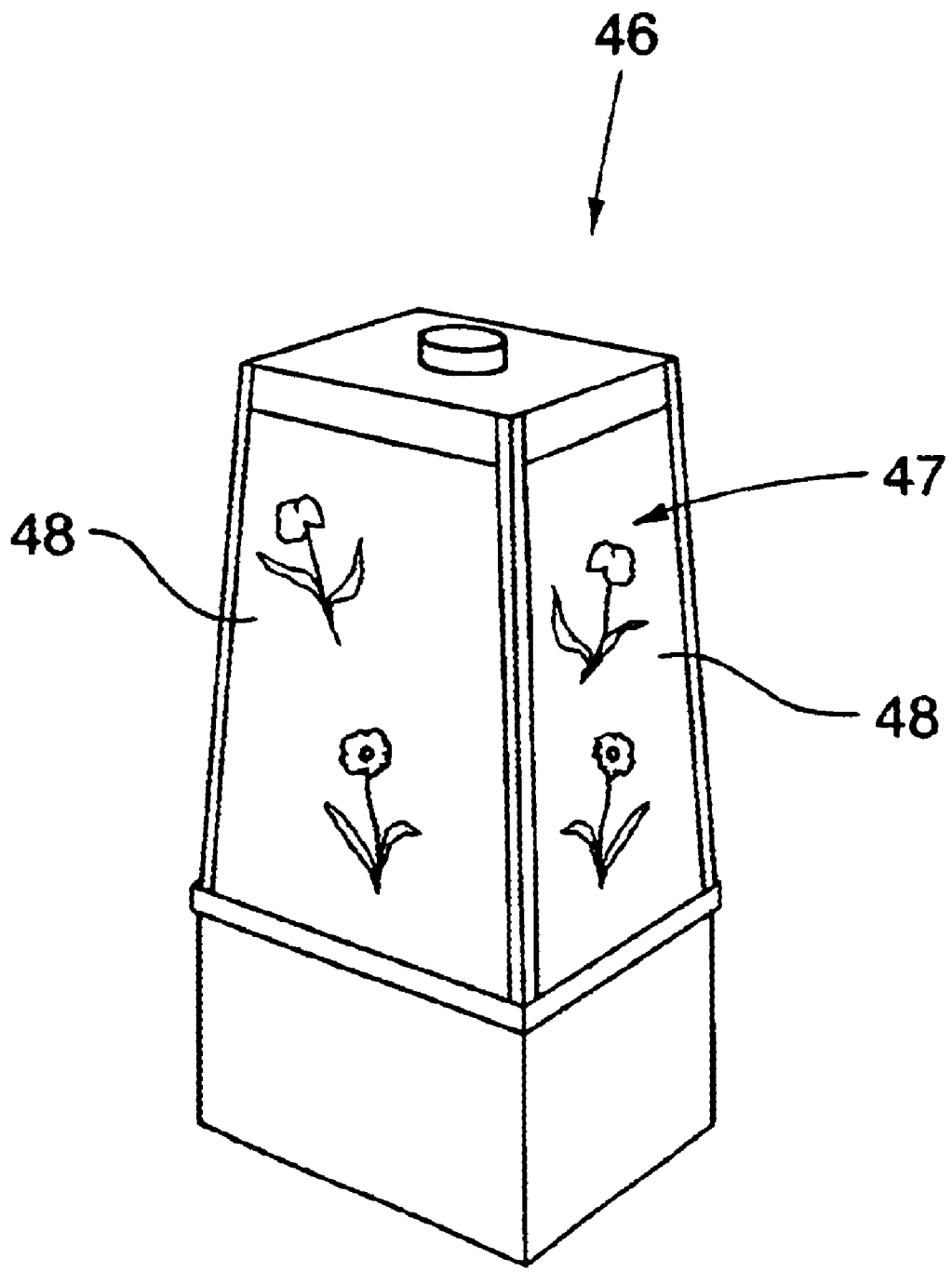
FIG. 2 is a diagram of another unit.

The unit 20 shown in FIG. 1 is intended to be configured for wall mounting. In FIG. 2, the unit 46 is configured as a tower unit. Here, the tower 47 is square, formed from four near-vertical matrix panels 48 that hold the plants. The water storage tank and other hydroponic components are located inside the tower 47. The hollow interior of the tower forms the air plenum. The cleaned air is discharged, through a duct, upwards and out of the top of the tower. Alternatively, the matrix panel could be of another shape, for example cylindrical, thereby forming a round tower.

What is claimed is:

1. Apparatus for cleansing air, wherein:
   the apparatus includes a plant-box, and the plant-box has a front wall, and enclosing walls, which enclose and define a plenum chamber;
   the plenum has an air outlet port, in one of the walls;
   the apparatus includes a powered fan, which is so disposed in the apparatus as to be effective to receive air from the plenum, through the air outlet port, and to discharge the air;
   the front wall of the plant-box includes a root matrix panel, which is made from air-permeable material, and is so arranged in the apparatus as to allow air to pass therethrough, into the plenum;
   the material of the root matrix panel is structurally solid, and is of such porosity or fibrosity as to enable the roots of plants to infiltrate thereinto, and to provide physical and mechanical anchorage and support for the roots and foliage of the said plants;
   the apparatus includes a mass of plants, the roots of which are infiltrated into and embedded in the material of the root matrix panel;
   the material of the root matrix panel of the plant-box is substantially inert with respect to microbiological actions and reactions associated with the mass of plants;
   the apparatus includes a hydroponic water and nutrient circulation system;
   the said system includes a storage tank containing hydroponic water, and a water outlet;
   the water outlet is positioned above the root matrix panel, and is so arranged that hydroponic water passes out from the outlet, down onto the root matrix panel;
   the apparatus is so arranged that hydroponic water trickles down, from the outlet, over and through the material of the root matrix panel, and over and through the roots of the plants embedded therein;
   the system is so arranged that the roots of the mass of plants are kept substantially constantly wetted by the hydroponic water;
   the system includes means for supplying nutrients for supporting and making viable the mass of plants into the hydroponic water;

the root matrix panel of the front wall of the plant-box has a thickness T cm, as measured in the direction in which air passes through the panel, and the root matrix panel has a permeability area A sq cm, through which the air passes, as measured perpendicularly to the thickness T;

the root matrix panel is disposed with the said area A of the panel having sufficient verticality that
(a) the hydroponic water passes downwards, under gravity, over and through the material of the panel, and
(b) air passes through the panel, into the plenum, in a direction that is at least roughly horizontal.

2. Apparatus of claim 1, wherein:

the permeability area A of the root matrix panel is at least roughly rectangular, having a width W cm and a height H cm;

the water outlet is so arranged as to distribute the hydroponic water evenly across the width W.

the height H is at least 50 cm, and the width W is at least 50 cm.

3. Apparatus of claim 1, wherein the thickness T of the root matrix panel is between ½ cm and 3 cm, and is substantially even over the permeability area of the root matrix panel.

4. Apparatus of claim 1, wherein:

the root matrix panel is set at a small angle L to the vertical;

the water outlet is so disposed as to deposit water onto the panel at a top outer edge thereof;

the angle L is such that the water flows down through the material of the panel, evenly through the thickness T thereof.

5. Apparatus of claim 4 wherein the angle L is such that the water passes out of the material of the panel by dripping from a bottom inner edge thereof, and the water, in passing out of the panel, substantially does not pass out of the panel from any portion of the panel other than the said bottom inner edge.

6. Apparatus of claim 1, wherein the hydroponic water and nutrient circulation system includes a pump, which is effective to keep up a constant trickle of the hydroponic water from the water outlet onto the root matrix panel.

7. Apparatus of claim 1, wherein the hydroponic water and nutrient circulation system includes:

reservoirs for storing nutrients;

means for monitoring the nutrients content of the hydroponic water, and automatic means for adding nutrients to the water, as required;

means for adding make up water, as required;

an operable drain, whereby some or all of the hydroponic water can be periodically drained off.

8. Apparatus of claim 1, in combination with a room in a building, the apparatus being so arranged in the room that air is drawn in from the room and passes through the apparatus repeatedly, on a circulation and recirculation basis.

9. Apparatus of claim 8 wherein the apparatus is so arranged that:

the fan creates a vacuum in the plenum, thereby drawing air from the room into the plenum, through the permeable root matrix panel;

the air pressure over the whole of the permeability area of the panel, inside the plenum, is substantially uniform;

air having passed through the plenum is discharged into the room.

10. Apparatus of claim 1, wherein:

the apparatus is structurally suitable for mounting on the wall of a room;

and the root matrix panel comprises a single flat rectangular panel, which faces out into the room.

11. Apparatus of claim 1, wherein:

the apparatus is of a tower configuration, being structurally suitable to support itself as a stand-alone item in a room;

the root matrix panel comprises two or more flat rectangular panels, disposed as vertical, or nearly vertical, side walls of the tower;

the plenum comprises a hollow enclosed interior of the tower;

the water storage tank is integrated into the structure of the tower.

12. Apparatus of claim 1, wherein the mass of plants is so disposed in the root matrix panel as to cover the whole permeability area of the panel, substantially evenly.

13. Apparatus of claim 1, wherein the mass of plants includes aromatic culinary herbs.

14. Apparatus of claim 1, wherein the mass of plants includes members of the mint family, Lamiaceae.

15. Apparatus of claim 1, wherein the mass of plants includes plants from one or more of the groups: ferns, mosses, orchids.

16. Apparatus of claim 1, wherein the mass of plants includes plants from one or more of the species: croton, baby's tears.

17. Apparatus of claim 1, wherein the material of the root matrix panel is formed as a moulding mat of thick polyester fibres.

* * * * *